United States Patent [19]
Bird

[11] 3,856,348
[45] Dec. 24, 1974

[54] CYCLE SADDLE WITH PLASTIC BASE
[75] Inventor: Martin J. Bird, Norwalk, Ohio
[73] Assignee: Persons-Majestic Mfg. Company, Worcester, Mass.
[22] Filed: June 28, 1973
[21] Appl. No.: 374,667

[52] U.S. Cl. .............................. 297/195, 297/214
[51] Int. Cl. ............................................. B62j 1/00
[58] Field of Search ........... 297/195, 208, 209, 214, 297/204, 210, 211, 212, 213, DIG. 2

[56] References Cited
UNITED STATES PATENTS

| | | | |
|---|---|---|---|
| 2,324,976 | 7/1943 | Soper | 297/214 |
| 3,077,363 | 2/1963 | Mesinger | 297/214 |
| 3,180,682 | 4/1965 | Paulen | 297/DIG. 2 |
| 3,604,748 | 9/1971 | Lamkemeyer | 297/214 |
| 3,698,763 | 10/1972 | Worley | 297/214 |
| 3,708,201 | 1/1973 | Lamkemeyer | 297/214 |
| 3,758,154 | 11/1973 | Kitaguchi | 297/214 |

FOREIGN PATENTS OR APPLICATIONS

| | | | |
|---|---|---|---|
| 948,932 | 2/1949 | France | 297/195 |
| 300,634 | 9/1932 | Italy | 297/214 |

*Primary Examiner*—James T. McCall
*Attorney, Agent, or Firm*—Charles R. Fay

[57] ABSTRACT

A cycle saddle having a one-piece molded plastic base which is resilient, affording a degree of deflection substantially midway of the saddle in the use thereof. The cover of the saddle is applied to the molded base with padding and the usual truss is secured to the base. In some cases metal strips are secured between the pommel and the rear edge portion of the base.

9 Claims, 6 Drawing Figures

PATENTED DEC 24 1974  3,856,348

CYCLE SADDLE WITH PLASTIC BASE

BACKGROUND OF THE INVENTION

There are in general three types of cycle saddles. These are: small hard and non-resilient types, for professionals and cross country racers; a touring or general purpose saddle which is more comfortable and wider to provide a comfortable seat for adult non-professional use; and juveniles e.g., banana or polo seats. This invention concerns the second catagory, a comfortable resilient seat particularly adapted for general use by adults.

Previously one of the best types of saddles of this nature was made by utilizing a steel frame or having secured therein multiple elongated coil springs, stretched lengthwise of the saddle to give it a certain degree of resilience. The padding and cover were applied to the frame, covering the springs. This is a relatively expensive construction and has been priced out of the market under competition from foreign imports so that manufacture and sale in this country is impractical.

It is the object of the present invention to provide a saddle which gives the same resilience as the coil spring type of saddle but being made mainly of plastic that is with respect to the base and frame thereof. This plastic base, resilient type of saddle, is practical to manufacture and sell in competition with foreign imports and provides substantially the same kind of ride and seat support as in the old style coil spring saddle.

SUMMARY OF THE INVENTION

A one-piece molded plastic base is provided, this base having a pommel area, a seat area extending to a curved rear edge thereof, and a surrounding flange. The usual truss is at the forward end of the pommel and to the rear edge portion of the plastic base, the rear edge portion incorporating a channel molded therein to accommodate a metal arc shaped bar to which the rear portion of the truss is connected.

Also, if desired, a pair of bowed metal strips may be secured to the forward portion of the pommel by the same fastener that secures the truss, these metal strips extending rearwardly and being connected by the same fasteners that connect the truss springs to the arc shaped metal bar. These metal strips are bowed downward away from and do not touch the major portion of the plastic base including the seating area of the saddle and the central portion where the resilience of the plastic base is most apparent. The metal strips provide for a stronger design where needed.

PREFERRED EMBODIMENT OF THE INVENTION

Figure 1:
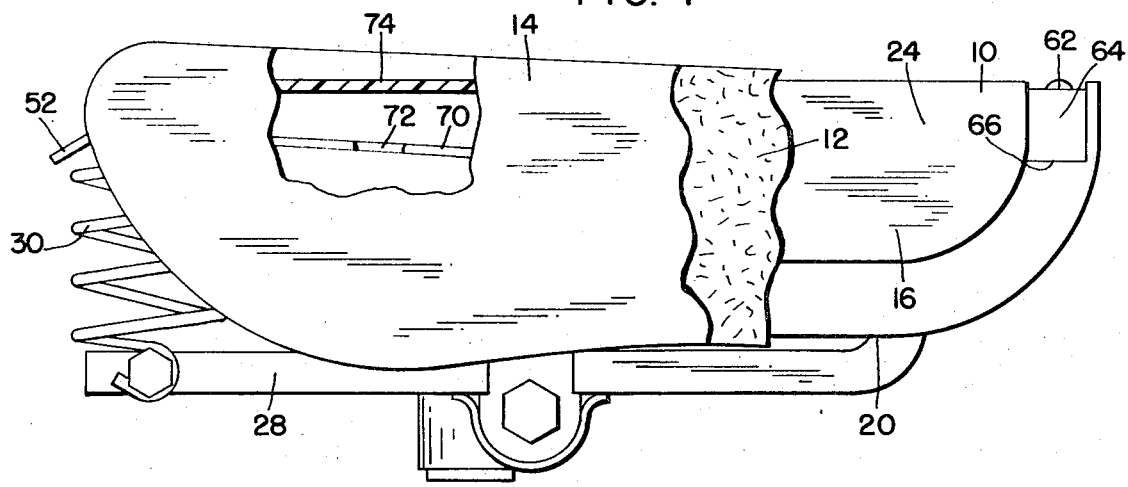
FIG. 1 is a view in side elevation, portions being broken away.

In FIG. 1 there is shown a molded plastic base or frame 10 which will be described more in detail. This is provided with padding at 12 and a cover 14. The molded plastic base or frame is provided with side flanges 16 and 18 and these are covered with the padding and the cover 14, the latter extending down under the lower edges of the molded plastic flanges as at 20 and up behind the same maintaining the parts assembled.

Figure 2:
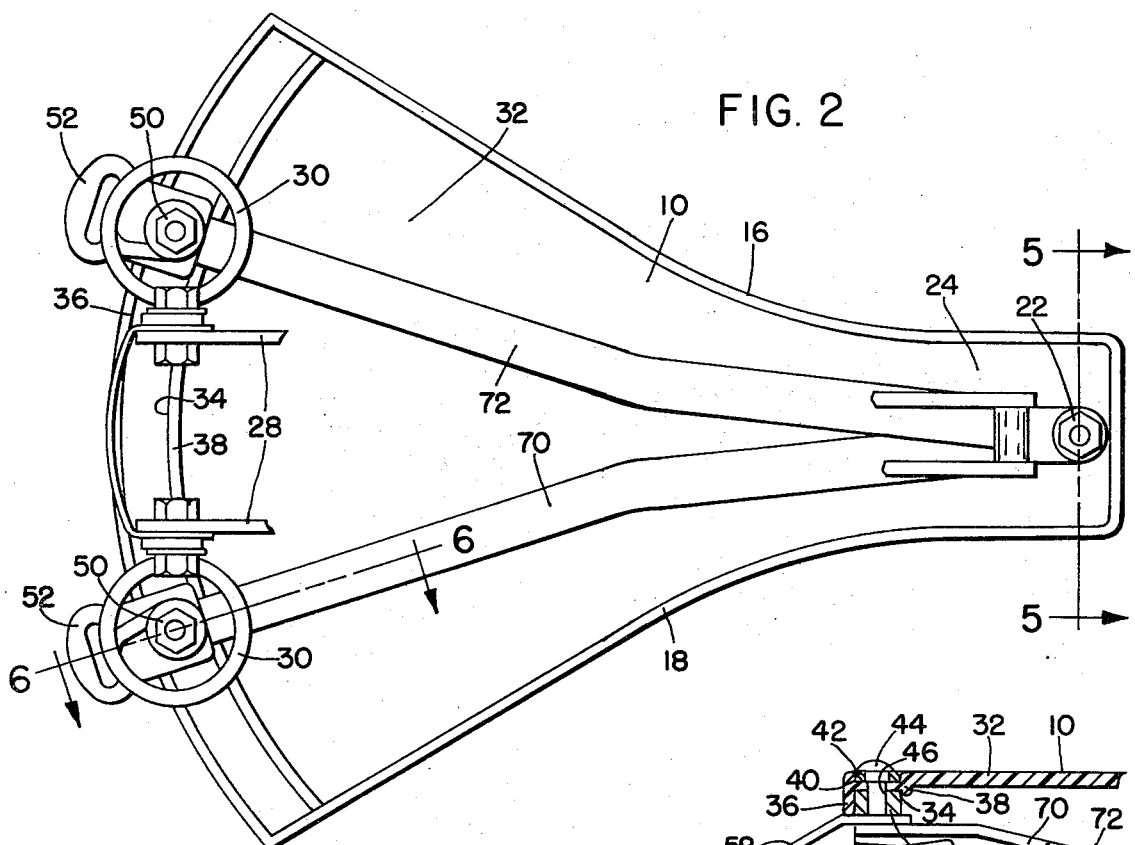
FIG. 2 is a bottom plan view of the entire saddle, portions broken away and parts omitted for clarity.

A conventional truss is secured to the underside of the base at 22 at the forward portion of the pommel area 24, the truss in turn being connected at its rear end as at 28 to the usual springs 30, 30, in turn secured by fasteners at the rear portion of the seat portion 32 of the molded plastic base 10, see FIG. 2.

At the rear edge portion of the seat portion of the plastic base there is provided a molded in arcuate groove or indentation 34 at the inside or lower aspect thereof, this being formed as by a pair of ribs 36, 38; and a similarly shaped groove is formed at the top surface of the frame as at 40.

Figure 6:
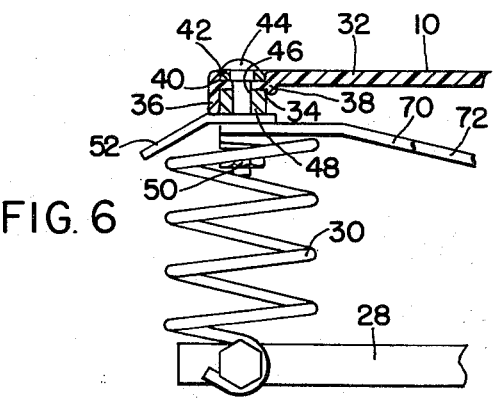
FIG. 6 is a section of line 6—6 of FIG. 2.
Figure 3:
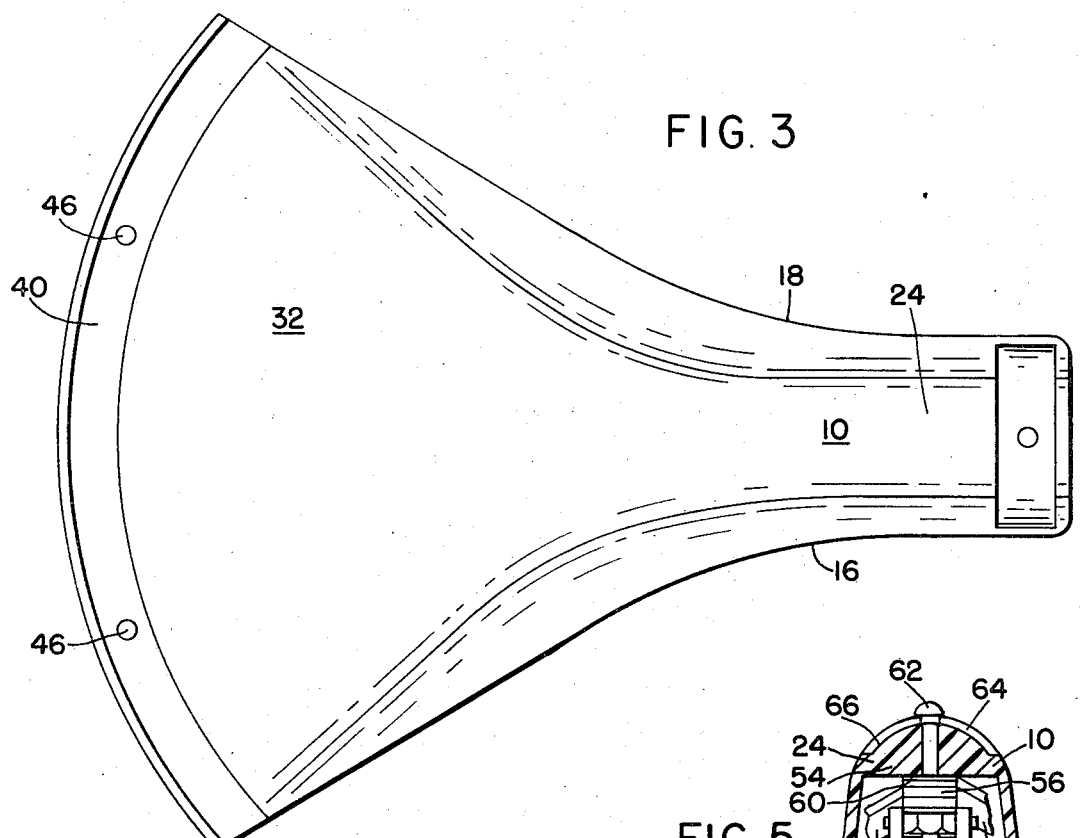
FIG. 3 is a top plan view of the plastic frame.
Figure 5:
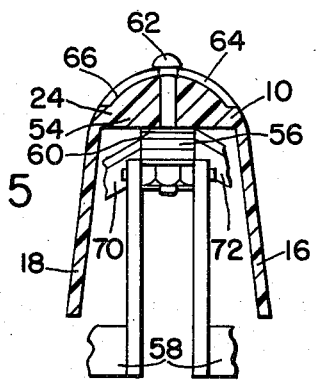
FIG. 5 is a section on line 5—5 of FIG. 2.

The top groove 40, see FIG. 6, receives a pair of short metal strips 42 into each of which is fitted a bolt 44 extending through plate 42 and through openings 46 in the plastic frame. Openings 46 are located in the bottom of the groove 34 and pass through arc-shaped bar 48 located in groove 34. Fasteners 50 on bolts 44 hold the springs 30 in position. Also, if desired, apertured plates 52 may likewise be held by the fastener 44 for the reception of straps, etc.

In the pommel area the plastic base 10 is provided with a molded-in solid flat portion 54 forming a base for a clip 56 securing the truss 58 to the pommel area. The reference numeral 60 indicates a washer or the like; and the head of a fastener, e.g., a carriage bolt indicated at 62 is located in the metal plate 64 in a corresponding recess formed for it as at 66. Thus it will be seen that the plastic molded base is firmly secured with respect to the truss and that with the addition of the padding and the cover the cycle saddle is complete. The plastic itself is strong and withstands many thousands of repeated blows in a testing machine and it flexes along a lateral line between the pommel area and the rear portion of the seat area so as to provide an extremely comfortable seat for adult use, and the equivalent of the old coil-spring base.

In some cases where it is desired to reduce this resilience and to make a somewhat stronger seat, a pair of elongated metal members 70, 72 are secured together and to the pommel and truss at 22, see FIG. 2. These members diverge and are secured by fasteners 44 and 50 at the rear of the seat portion, and as shown in FIG. 1 these metal members are fully separated from the base in the seating area of the saddle, this area being indicated in FIG. 1 at 74.

These metal members reduce the resilience because they tend to hold the pommel and the rear portion of the seat area apart. The plastic base will still be resilient under load but to a less degree than where these members 70 and 72 are not utilized.

Figure 4:
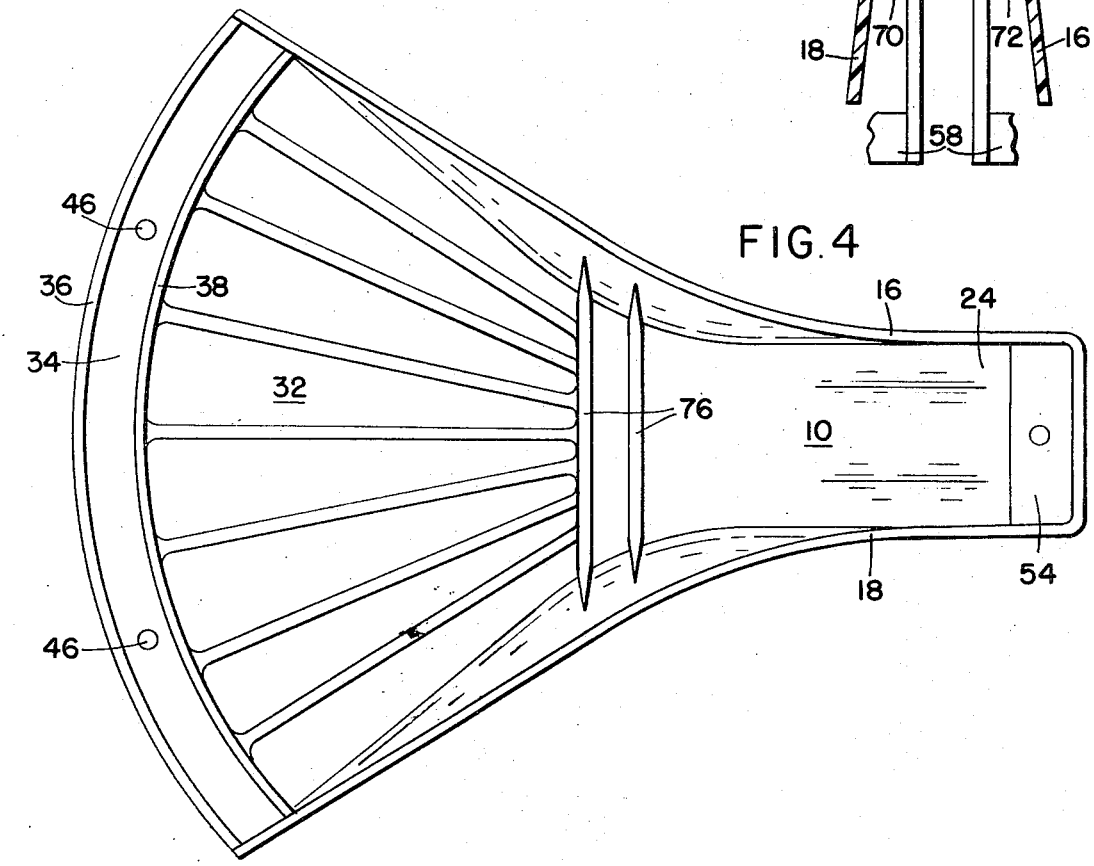
FIG. 4 is a bottom plan view thereof.

FIG. 4 shows a bottom plan view of the saddle including raised ribs which may be used for reinforcing purposes, these ribs being molded into the saddle. There may also be used transverse ribs 76 which tend to slightly resist outward divergence of the flanges 16 and 18 of the molded plastic frame.

I claim:

1. A cycle saddle comprising a one piece molded plastic base including a pommel and integral seat portion, the seat portion having diverging side edges, side flanges on the base extending downwardly from the pommel area and the seating area, a truss secured at its forward end to the forward end portion of the pommel and extending to the rear edge area of the seat portion, springs interposed between the truss and the rear edge of the plastic base, said base being generally self-sustaining but deflective downwardly under conditions of load in the seating area, and a substantially rigid elongated metal member fastened at one end to the pommel and at the rear edge portion of the seat portion, said metal member being spaced from the molded plastic base in the seating area.

2. The cycle saddle of claim 1 including an arcuate metal bar mounted on the molded plastic base at the rear edge of the seat portion thereof and fasteners extending through the member and through the metal bar securing the springs thereto.

3. The cycle saddle of claim 2 including a molded-in arc-shaped groove at the lower surface of the plastic base at the rear edge of the seat portion, the arcuate bar being located in said groove.

4. The cycle saddle of claim 1 wherein the forward edge portion of the pommel area of the molded plastic base is arcuate and including an indentation therein, a metal plate in the indentation, said plate also being arcuate, a fastener extending through the metal plate, and a clip holding the truss to said fastener at the underside of the molded plastic base.

5. The cycle saddle of claim 4 including a thickened abutment area at the underside of the molded plastic base at the extreme forward edge of the pommel, the fastener for the truss extending therethrough.

6. The cycle saddle of claim 1 including a second elongated member secured to the pommel and diverging in the seating area from the first member.

7. The cycle saddle of claim 6 wherein the metal members are secured to the truss springs.

8. A cycle saddle comprising a one-piece molded plastic base including a pommel and seat portion, said base being generally self-sustaining but resilient and having a degree of deflection under load, a truss connected to the base, a fore and aft member connected to the pommel and to a rear edge portion of the seat portion of the base, said member being substantially rigid and spaced from the base sufficiently to be out of contact with the plastic base in the major portion of the seat portion thereof at all times, said base being deflected under load in said major portion thereof toward said member.

9. The cycle saddle of claim 8 including a second fore and aft member, said members diverging from the pommel towards the rear edge of the seat portion, the second member being also out of contact with the plastic base in the major portion of the seat portion thereof.

* * * * *